US009854065B2

(12) United States Patent
Koster et al.

(10) Patent No.: US 9,854,065 B2
(45) Date of Patent: *Dec. 26, 2017

(54) SYSTEM AND METHOD FOR PROVIDING VIRTUAL SPACES FOR ACCESS BY USERS VIA THE WEB

(71) Applicant: Disney Enterprises, Inc., Burbank, CA (US)

(72) Inventors: Raphael Koster, San Diego, CA (US); Sean Riley, San Diego, CA (US); John Donham, San Diego, CA (US)

(73) Assignee: Disney Enterprises, Inc., Burbank, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/754,682

(22) Filed: Jun. 29, 2015

(65) Prior Publication Data

US 2015/0304454 A1 Oct. 22, 2015

Related U.S. Application Data

(63) Continuation of application No. 12/249,154, filed on Oct. 10, 2008, now Pat. No. 9,100,249.

(51) Int. Cl.
*G06F 3/048* (2013.01)
*H04L 29/06* (2006.01)
(Continued)

(52) U.S. Cl.
CPC .......... *H04L 67/38* (2013.01); *G06F 3/04815* (2013.01); *G06F 3/04842* (2013.01);
(Continued)

(58) Field of Classification Search
None
See application file for complete search history.

(56) References Cited

U.S. PATENT DOCUMENTS

| 5,525,765 A | 6/1996 | Freiheit .......................... 181/30 |
| 5,736,982 A | 4/1998 | Suzuki et al. ................ 345/330 |

(Continued)

FOREIGN PATENT DOCUMENTS

| EP | 0 991 009 | 4/2000 |
| JP | 2002-360936 | 12/2002 |

(Continued)

OTHER PUBLICATIONS

James, Daniel and Walton, Gordon, Editors, "2004 Persistent Worlds Whitepaper", IDGA Online Games SIG, <archives.igda.org/online/IGDA_PSW_Whitepaper_2004.pdf>, 82 pages.

(Continued)

*Primary Examiner* — Tuan S Nguyen
(74) *Attorney, Agent, or Firm* — Sheppard Mullin Richter & Hampton LLP (57) ABSTRACT

A system configured to provide one or more virtual spaces that are accessible to users. The virtual spaces may be provided such that an enhanced level of interactivity between the virtual spaces and the Web, including resources that communicate with the system via the Internet (e.g., via users, websites, webpages, other web resources, etc.) and/or other networks. To provide this enhanced level of interactivity, the system may enable interactions between an instance of a virtual space and the Web (e.g., queries, commands, communication, administrative controls, etc.) via a standard web protocol, such as a HyperText Transfer Protocol (e.g., http, https, etc.) and/or other standard web protocols. Since interactions take place between the instance of the virtual space and the Web via a standard web protocol, the instance of the virtual space may interact directly with Web resources such as web servers, web browsers, websites, webpages, and/or other Web resources.

19 Claims, 2 Drawing Sheets

(51) Int. Cl.
 H04L 29/12 (2006.01)
 H04L 29/08 (2006.01)
 G06F 3/0481 (2013.01)
 G06F 3/0484 (2013.01)
(52) U.S. Cl.
 CPC ........ *H04L 29/12594* (2013.01); *H04L 61/30* (2013.01); *H04L 67/02* (2013.01); *H04L 67/42* (2013.01); *A63F 2300/407* (2013.01); *A63F 2300/5573* (2013.01); *A63F 2300/69* (2013.01)

(56) References Cited

U.S. PATENT DOCUMENTS

| | | | |
|---|---|---|---|
| 5,950,202 A | 9/1999 | Durward et al. | 707/10 |
| 6,009,458 A | 12/1999 | Hawkins et al. | 709/203 |
| 6,219,045 B1 | 4/2001 | Leahy et al. | 345/331 |
| 6,289,248 B1 | 9/2001 | Conley et al. | 607/59 |
| 6,323,857 B1 | 11/2001 | Mielekamp et al. | 345/419 |
| 6,493,001 B1 | 12/2002 | Takagi et al. | 345/759 |
| 6,791,549 B2 | 9/2004 | Hubrecht et al. | 345/473 |
| 6,961,060 B1 | 11/2005 | Mochizuki et al. | 345/473 |
| 7,454,715 B2 | 11/2008 | Chen et al. | 715/850 |
| 7,534,169 B2 | 5/2009 | Amaitis et al. | 463/39 |
| 7,577,847 B2 | 8/2009 | Nguyen et al. | 713/186 |
| 7,587,276 B2 | 9/2009 | Gold et al. | 701/211 |
| 7,587,338 B2 | 9/2009 | Owa | 705/26 |
| 7,681,114 B2 | 3/2010 | Ambrosino et al. | 715/201 |
| 7,703,023 B2 | 4/2010 | O'Mahony et al. | 715/745 |
| 7,788,323 B2 | 8/2010 | Greenstein et al. | 709/204 |
| 7,797,261 B2 | 9/2010 | Yang | 706/45 |
| 7,827,507 B2 | 11/2010 | Geise et al. | 715/850 |
| 7,904,577 B2 | 3/2011 | Taylor | 709/230 |
| 8,027,784 B2 | 9/2011 | Geelen | 701/201 |
| 8,066,571 B2 | 11/2011 | Koster et al. | 463/42 |
| 8,196,050 B2 | 6/2012 | Riley et al. | 715/757 |
| 8,402,377 B2 | 3/2013 | Riley et al. | 715/757 |
| 8,627,212 B2 | 1/2014 | Riley et al. | 715/757 |
| 2001/0049787 A1 | 12/2001 | Morikawa et al. | 713/156 |
| 2002/0049814 A1 | 4/2002 | Yoo | 709/205 |
| 2002/0054163 A1 | 5/2002 | Yamada et al. | 345/848 |
| 2002/0082910 A1 | 6/2002 | Kontogouris | 705/14 |
| 2002/0112033 A1 | 8/2002 | Doemling et al. | 709/219 |
| 2002/0169670 A1 | 11/2002 | Barsade et al. | 705/14 |
| 2003/0008713 A1 | 1/2003 | Ushiro et al. | 463/42 |
| 2003/0046689 A1 | 3/2003 | Gaos | 725/34 |
| 2003/0064705 A1 | 4/2003 | Desiderio | 455/412 |
| 2003/0231212 A1 | 12/2003 | Slemmer et al. | 345/771 |
| 2004/0014527 A1 | 1/2004 | Orr et al. | 463/43 |
| 2004/0230458 A1 | 11/2004 | Takayama et al. | 705/3 |
| 2005/0033511 A1 | 2/2005 | Pechatnikov et al. | 701/210 |
| 2005/0091111 A1 | 4/2005 | Green et al. | 705/14 |
| 2005/0160141 A1 | 7/2005 | Galley et al. | 709/204 |
| 2005/0210395 A1 | 9/2005 | Wakita et al. | 715/753 |
| 2005/0272504 A1 | 12/2005 | Eguchi et al. | 463/40 |
| 2006/0015814 A1 | 1/2006 | Rappaport et al. | 715/733 |
| 2006/0211462 A1 | 9/2006 | French et al. | 463/1 |
| 2006/0223635 A1 | 10/2006 | Rosenberg | 463/37 |
| 2006/0265483 A1 | 11/2006 | Wang et al. | 709/223 |
| 2006/0287815 A1 | 12/2006 | Gluck | 701/208 |
| 2007/0020603 A1 | 1/2007 | Woulfe | 434/350 |
| 2007/0021213 A1 | 1/2007 | Foe et al. | 463/42 |
| 2007/0027628 A1 | 2/2007 | Geelen | 701/213 |
| 2007/0050716 A1 | 3/2007 | Leahy et al. | 715/706 |
| 2007/0082738 A1 | 4/2007 | Fickie et al. | 463/42 |
| 2007/0083323 A1 | 4/2007 | Rosenberg | 701/200 |
| 2007/0167239 A1 | 7/2007 | O'Rourke | 463/42 |
| 2007/0190494 A1 | 8/2007 | Rosenberg | 434/11 |
| 2007/0288598 A1 | 12/2007 | Edeker et al. | 709/217 |
| 2008/0052054 A1 | 2/2008 | Beverina et al. | 703/6 |
| 2008/0082311 A1 | 4/2008 | Meijer et al. | 703/24 |
| 2008/0094417 A1 | 4/2008 | Cohen | 345/632 |
| 2008/0134056 A1 | 6/2008 | Shuster | 715/757 |
| 2008/0221790 A1 | 9/2008 | Min et al. | 701/209 |
| 2008/0280684 A1 | 11/2008 | McBride et al. | 463/42 |
| 2009/0036216 A1 | 2/2009 | Ratcliff | 463/42 |
| 2009/0040186 A1 | 2/2009 | Esenther | 345/173 |
| 2009/0077158 A1 | 3/2009 | Riley et al. | 709/202 |
| 2009/0077463 A1 | 3/2009 | Koster | 715/234 |
| 2009/0077475 A1 | 3/2009 | Koster et al. | 715/757 |
| 2009/0307226 A1 | 12/2009 | Koster et al. | 707/10 |
| 2009/0307611 A1 | 12/2009 | Riley | 715/757 |
| 2010/0058235 A1 | 3/2010 | Borst | 715/810 |
| 2010/0094547 A1 | 4/2010 | Geelen et al. | 701/209 |
| 2010/0095213 A1 | 4/2010 | Koster et al. | 715/733 |
| 2010/0311483 A1 | 12/2010 | Fields et al. | 463/2 |
| 2012/0059881 A1 | 3/2012 | Koster et al. | 709/204 |
| 2012/0221417 A1 | 8/2012 | Riley et al. | 705/14.66 |
| 2013/0191228 A1 | 7/2013 | Riley et al. | 705/14.73 |

FOREIGN PATENT DOCUMENTS

| | | |
|---|---|---|
| WO | WO 2005/015505 | 2/2005 |
| WO | WO 2009/039080 | 3/2009 |
| WO | WO 2009/039084 | 3/2009 |
| WO | WO 2009/039085 | 3/2009 |
| WO | WO 2009/152074 | 12/2009 |
| WO | WO 2009/152077 | 12/2009 |
| WO | WO 2010/042783 | 4/2010 |

OTHER PUBLICATIONS

WoWWiki, Paid Character Transfer FAQ (US), Feb. 23, 2007, Blizzard Entertainment, <www.wowwiki.com/Paid_Character_Transfer_FAQ_(US)>, 6 pages.

Linden Research, Inc., "Second Life Wiki: Second Life Work/FAQs", Nov. 9, 2009, Linden Research, Inc., <http://wiki.secondlife.com/wiki/Second_Life_Work/FAQs>, 2 pages.

Blizzard Entertainment, Inc., World of Warcraft Manual 2004, Blizzard Entertainment, <willishome.com/Manual.pdf>, 114 pages.

Kumar, Sanjeev, et al., "Second Life and the New Generation of Virtual Worlds", Computer, vol. 41, No. 9, Sep. 2008, pp. 46-53, doi: 10.1109/MC.2008.398, http://ieeexplore.ieee.org/stamp/stamp.jsd?tp-&arnumber=4623222&isnumber=4623205, 8 pages.

Wilson, Tracy V., "How World of Warcraft Works", Nov. 16, 2007, HowStuffWorks.com, http://electronics.howstuffworks.com/world-of-warcraft.htm, Apr. 13, 2011, 4 pages.

Hartman, Jed, et al., The VRML 2.0 Handbook; Building Moving Worlds on the Web, Addison-Wesley Publishing Company, © 1996 Silicon Graphics Inc., 40 pages.

SYSTEM AND METHOD FOR PROVIDING VIRTUAL SPACES FOR ACCESS BY USERS VIA THE WEB

CROSS REFERENCE TO RELATED APPLICATIONS

The present application is a continuation of U.S. patent application Ser. No. 12/249,154, filed Oct. 10, 2008, entitled "System and Method for Providing Virtual Spaces for Access by Users Via the Web", the disclosure of which is incorporated herein by reference in its entirety.

FIELD OF THE INVENTION

The invention relates to systems configured to provide virtual spaces for access by users.

BACKGROUND OF THE INVENTION

Systems that provide virtual worlds and/or virtual gaming spaces accessible to a plurality of users for real-time interaction are known. These systems tend to be relatively monolithic, and provide relatively limited interaction with outside information sources and/or resources. As such, conventional virtual worlds tend to be relatively closed, and may not facilitate the communication of information between the virtual world (and/or instances thereof) and outside information sources and/or users.

On the other hand, the Internet, and/or other networks, tend to make information from a variety of information sources and resources readily accessible to users. Interaction with information available via the Internet takes a variety of forms, including the transmission of information in the form of webpages between web servers serving the webpages and web browsers that enable users to receive and interact with the webpages.

Despite widespread usage of the Internet to make instances of virtual worlds available to a plurality of users simultaneously, access to a virtual world over the Internet or some other network generally requires a specific, proprietary client application. Servers executing instances of the virtual worlds generally are not configured to enable information to pass freely between the instance of a virtual world and other resources on the Internet. Similarly, using a traditional virtual world system that is executing an instance of a virtual world, a user may not be able to gain access to information available on the Internet (outside of the instance of the virtual world) via the proprietary client application used to access the instance of the virtual world.

SUMMARY

One aspect of the invention relates to a system configured to provide one or more virtual spaces that are accessible to users. The virtual spaces may be provided such that an enhanced level of interactivity between the virtual spaces and the Web, including resources that communicate with the system via the Internet (e.g., via users, websites, webpages, other web resources, etc.) and/or other networks. To provide this enhanced level of interactivity, the system may enable interactions between an instance of a virtual space and the Web (e.g., queries, commands, communication, administrative controls, etc.) via a standard web protocol, such as a HyperText Transfer Protocol (e.g., http, https, etc.) and/or other standard web protocols. Since interactions take place between the instance of the virtual space and the Web via a standard web protocol, the instance of the virtual space may interact directly with Web resources such as web servers, web browsers, websites, webpages, and/or other Web resources.

In some embodiments, to enable web browsers to interact with an entity within an instance of a virtual space (e.g., an object, an avatar, a character, an area, the virtual space as a whole, a feature of topography, etc.), the entity within the instance of the virtual space may be associated with a network location, such as a Uniform Resource Locator. Communication, such as commands, may be submitted by a web browser to the network location associated with a given entity in the instance of the virtual space. Upon receipt of one or more of these commands, a server executing the instance of the virtual space may determine if the received command(s) is supported for the entity associated with the network location, execute one or more operations dictated by supported command(s) that were received, and return results of the supported command(s) to the web browser via the network location. The commands supported for the entity may include one or more of a query for information about the entity, one or more other entities within the instance, the instance, and/or other information related to the instance; a command resulting in manipulation of the entity within the instance, the manipulation of one or more other entities, and/or other manipulations of the instance; and/or other commands.

The network location associated with the entity in the instance of the virtual space may be persistent. As such, for as long as the entity is present in the instance of the virtual space, access to the entity may be provided to the Web (e.g., web browsers, etc.) via the network location. This may facilitate location of the entity by the Web. In some implementations, the network location may be persistent for the entity within the instance of the virtual space even if the object leaves the instance of the virtual space and then returns. In some implementations, the network location for the entity may be persistent across a plurality of instances of virtual spaces such that even as the entity changes virtual spaces, the network location at which the entity may be accessed by the Web may be the same (or substantially the same).

In some embodiments, an entity within an instance of a virtual space may include a browser, such as a web browser, that is capable of interacting with the Web. For example, the browser may be capable of interacting with content included in one or more websites, webpages, and/or other Web resources. The Web resources interacted with by the browser may include one or more resources that are served remotely from the instance of the virtual space by a web server. The browser included in the entity may be manipulated by a server that is executing the instance of the virtual space that is separate (and/or remote from) the web server. The browser may be manipulated by the server executing the instance of the virtual space in response to one or more commands that are input to the server from a client that provides access to the virtual space (e.g., in the form of a display and/or interface) for a user. The interaction of the browser with the Web may include, in some implementations, retrieving information from one or more Web resources. The retrieved information may then be implemented in the execution of the instance of the virtual world, and/or transmitted from the server executing the instance of the virtual space to the client (e.g., for display on the client).

According to various embodiments, the system configured to provide access to a plurality of virtual spaces may implement a unit of computer readable information that describes various aspects of an object present in an instance of a virtual space, or "an object record." The object record may include manifestation information that relates to the manifestation of the object within the instance of the virtual space. The manifestation information may include visual representation information that describes a visual representation of the object. The object record may include network location information that dictates one or more aspects of an assignment of a network location (e.g., a Uniform Resource Locator) to the object by a server executing the instance of the virtual space. The one or more aspects of the assignment of the network location to the object dictated by the network location information may include, for example, a naming convention that dictates at least a portion of the name of the network location that is assigned to the object. The object record may specify whether the object should include a browser capable of interacting with Web resources. The object record may include command information for the object. The command information for the object may include a set of commands to be supported by the server executing the instance of the virtual space at the network location assigned to the object. The command information may include a set of commands to be supported for the browser associated with the object.

In some embodiments, an instance of a virtual space may be associated with a network location, such as a Uniform Resource Locator that is accessible to Web resource (e.g., web browsers, web servers, etc.). The network location may be associated with an entry point to the virtual space, and/or with the instance of the virtual space as a whole. As such, requests for entry into the instance may be received at the network location. The request may include information that identifies and/or authenticates a user requesting entry. The request may include a command to determine a view of the instance for the user, and to transmit the view to a client capable of formatting views of the instance for display to the user.

In some implementations, the command requesting entry to the instance may include information related to some third-party entity (e.g., a business, a user group, an education institution, a club, etc.) other than the user to be provided with entry to the instance. The command may identify and/or authenticate the third-party. The third-party may be a party that has facilitated access of the user to the instance. For example, a hyper-link may appear on a third-party webpage that can be viewed and selected by the user via a web browser. Upon selection by the user, a command may be generated to the network location associated with the instance (e.g., by the web browser, by a web server serving the webpage, etc.) requesting entry for the user to the instance of the virtual space. The command may be in a standard web protocol, such as a HyperText Transfer Protocol. Third-party authentication in the command may be required for entry into the instance, as this may provide access to the instance only for users also authorized to access the webpage of the third-party entity. In some embodiments, third-party identification and/or authorization may be implemented to restrict access to the instance of the virtual space, to "count" the number of users directed to the instance by the third-party, and/or for other purposes.

In some implementations, the command that identifies and/or authenticates the third-party entity may further specify one or more operations to be performed by a server executing the instance of the virtual space. The one or more operations may include, for example, providing a heightened degree of access to the instance for the user, endowing an object associated with the user (e.g., an avatar, an object controlled by an avatar, etc.) with one or more "special" abilities (e.g., abilities not provided automatically to users accessing instance 32), and/or other operations. This may enable the third-party entity to provide an enhanced experience to users within the instance, if the instance is accessed via the third-party entity. By way of non-limiting example, a webpage associated with the third-party entity may charge a user for a special ability (or some other advantage or enhancement) within the instance. Upon receipt of payment (e.g., in real world or virtual currency) via a webpage provided by the third-party, the third-party entity may enable generation of a request to the server executing the instance of the virtual space at the network location associated with the instance, the request identifying and/or authenticating the third-party entity, requesting entry for the user into the instance, and specifying one or more operations that will provide the user with the special abilities within the instance. The request may be generated in a standard web protocol, and, as such, may be generated by the web server serving the third-party entity's webpage and/or the web browser being used by the user to access the webpage.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
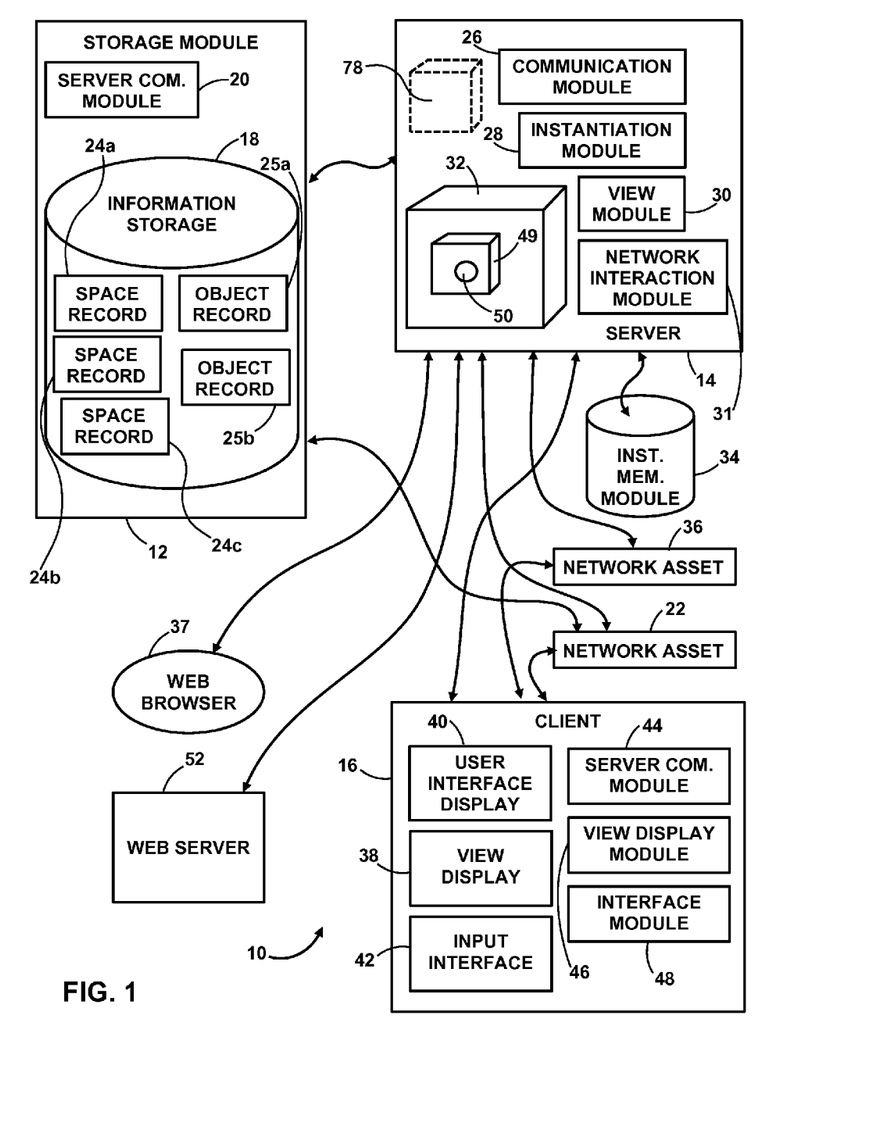
FIG. 1 illustrates a system configured to provide one or more virtual spaces that may be accessible to users, according to one or more embodiments of the invention.

FIG. 1 illustrates a system 10 configured to provide one or more virtual spaces that may be accessible to users. In some embodiments, system 10 may include a storage module 12, a server 14, a client 16, and/or other components. Storage module 12, server 14, and client 16 may be in operative communication with each other. System 10 may be configured such that information related to a given virtual space may be transmitted from storage module 12 to server 14, which may then execute an instance of the virtual space. Views of the virtual space may be generated by server 14 from the instance of the virtual space. Information related to the views may be transmitted from server 14 to client 16 to enable client 16 to format the views for display to a user. System 10 may further enable interaction between the instance of the virtual space and one or more entities over the Internet, or some other network. To enable this interaction information may be exchanged between the instance of the virtual space and the one or more entities via standard network protocols, such as a HyperText Transfer Protocol ("HTTP").

System 10 may implement a markup language for communication between components (e.g., storage module 12, server 14, client 16, etc.). Information may be communicated between components via markup elements of the markup language. By virtue of communication between the components of system 10 in the markup language, various enhancements may be achieved. For example, information may be transmitted from storage module 12 to server 14 that configures server 14 to execute an instance of the virtual space may be provided to server 14 via the markup language at or near the time of instantiation. Similarly, information transmitted from server 14 to client 16 may enable client 16 to generate views of the virtual space by merely assembling the information indicated in markup elements communicated thereto. The implementation of the markup language may facilitate creation of a new virtual space by the user of client 16, and/or the customization/refinement of existing virtual spaces.

As used herein, a virtual space may comprise a simulated space (e.g., a physical space) instanced on a server (e.g., server 14) that is accessible by a client (e.g., client 16), located remotely from the server, to format a view of the virtual space for display to a user of the client. The simulated space may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual space, and/or surface features of a surface or objects that are "native" to the virtual space. In some implementations, the topography may describe a surface (e.g., a ground surface) that runs through at least a substantial portion of the virtual space. In some implementations, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

As used herein, the term "markup language" may include a language used to communicate information between components via markup elements. Generally, a markup element is a discrete unit of information that includes both content and attributes associated with the content. The markup language may include a plurality of different types of elements that denote the type of content and the nature of the attributes to be included in the element. For example, in some embodiments, the markup elements in the markup language may be of the form [O_HERE]|objectId|artIndex|x|y|z|name|templateId. This may represent a markup element for identifying a new object in a virtual space. The parameters for the mark-up element include: assigning an object Id for future reference for this object, telling the client what art to draw associated with this object, the relative x, y, and z position of the object, the name of the object, and data associated with the object (comes from the template designated). As another non-limiting example, a mark-up element may be of the form [O_GONE]|objId. This mark-up element may represent an object going away from the perspective of a view of the virtual space. As yet another example, a mark-up element may be of the form [O_MOVE]|objectId|x|y|z. This mark-up element may represent an object that has teleported to a new location in the virtual space. As still another example, a mark-up element may be of the form [O_SLIDE]|objectId|x|y|z|time. This mark-up element may represent an object that is gradually moving from one location in the virtual space to a new location over a fixed period of time. It should be appreciated that these examples are not intended to be limiting, but only to illustrate a few different forms of the markup elements.

Storage module 12 may include information storage 18, a server communication module 20, and/or other components. Generally, storage module 12 may store information related to one or more virtual spaces. The information stored by storage module 12 that is related to a given virtual space may include topographical information related to the topography of the given virtual space, manifestation information related to the manifestation of one or more objects positioned within the topography and/or unseen forces experienced by the one or more objects in the virtual space, interface information related to an interface provided to the user that enables the user to interact with the virtual space, space parameter information related to parameters of the virtual space, network communication information related to communication between the virtual space and the Web (and/or one or more entities over a network beside the Internet), and/or other information related to the given virtual space.

The manifestation of the one or more objects may include visual representations of the one or more objects, the locomotion characteristics of the one or more objects, the size of the one or more objects, the identity and/or nature of the one or more objects, interaction characteristics of the one or more objects, and/or other aspect of the manifestation of the one or more objects. The interaction characteristics of the one or more objects described by the manifestation information may include information related to the manner in which individual objects interact with and/or are influenced by other objects, the manner in which individual objects interact with and/or are influenced by the topography (e.g., features of the topography), the manner in which individual objects interact with and/or are influenced by unseen forces within the virtual space, and/or other characteristics of the interaction between individual objects and other forces and/or objects within the virtual space. The interaction characteristics of the one or more objects described by the manifestation information may include scriptable behaviors and, as such, the manifestation stored within storage module 12 may include one or both of a script and a trigger associated with a given scriptable behavior of a given object (or objects) within the virtual space. The unseen forces present within the virtual space may include one or more of gravity, a wind current, a water current, an unseen force emanating from one of the objects (e.g., as a "power" of the object), and/or other unseen forces (e.g., unseen influences associated with the environment of the virtual space such as temperature and/or air quality).

In some embodiments, the manifestation information may include information related to the sonic characteristics of the one or more objects positioned in the virtual space. The sonic characteristics may include the emission characteristics of individual objects (e.g., controlling the emission of sound from the objects), the acoustic characteristics of individual objects, the influence of sound on individual objects, and/or other characteristics of the one or more objects. In such embodiments, the topographical information may include information related to the sonic characteristics of the topography of the virtual space. The sonic characteristics of the topography of the virtual space may include acoustic characteristics of the topography, and/or other sonic characteristics of the topography.

According to various embodiments, content included within the virtual space (e.g., visual content formed on portions of the topography or objects present in the virtual space, objects themselves, etc.) may be identified within the information stored in storage module 12 by reference only. For example, rather than storing a structure and/or a texture associated with the structure, storage module 12 may instead store an access location at which visual content to be implemented as the structure (or a portion of the structure) or texture can be accessed. In some implementations, the access location may include a Uniform Resource Locater that points to a network location. The network location identified by the access location may be associated with a network asset 22. Network asset 22 may be located remotely from each of storage module 12, server 14, and client 16. For example, the access location may include a network Uniform Resource Locater address (e.g., an internet Uniform Resource Locater address, etc.) at which network asset 22 may be accessed.

It should be appreciated that not only solid structures within the virtual space may be identified in the information stored in storage module 12 by reference only. For example, visual effects that represent unseen forces or influences may be stored by reference as described above. Further, information stored by reference may not be limited to visual content. For example, audio content expressed within the virtual space may be stored within storage module 12 by reference, as an access location at which the audio content can be accessed. Other types of information (e.g., interface information, space parameter information, etc.) may be stored by reference within storage module 12.

The interface information stored within storage module 12 may include information related to an interface provided to the user that enables the user to interact with the virtual space. More particularly, in some implementations, the interface information may include a mapping of an input device provided at client 16 to commands that can be input by the user to system 10. For example, the interface information may include a key map that maps keys in a keyboard (and/or keypad) provided to the user at client 16 to commands that can be input by the user to system 10. As another example, the interface information may include a map that maps the inputs of a mouse (or joystick, or trackball, etc.) to commands that can be input by the user to system 10. In some implementations, the interface information may include information related to a configuration of an interface display provided to the user at client 16, through which the user may input information to system 10. For example, the interface display may receive communication to other users interacting with the virtual space, input dictating actions to be performed by one or more objects within the virtual space, a request for a different point of view for the view, a request for a more (or less) sophisticated view (e.g., a 2-dimensional view, a 3-dimensional view, etc.), a request for one or more additional types of data to be displayed in the interface display, and/or other information.

The interface display may be configured (e.g., by the interface information stored in storage module 12) to provide information to the user about conditions in the virtual space that may not be apparent simply from viewing the space. For example, such conditions may include the passage of time, ambient environmental conditions, and/or other conditions. The interface display may be configured (e.g., by the interface information stored in storage module 12) to provide information to the user about one or more objects within the space. For instance, information may be provided to the user about objects associated with the topography of the virtual space (e.g., coordinate, elevation, size, identification, age, status, etc.). In some implementations, information may be provided to the user about objects that represent animate characters (e.g., wealth, health, fatigue, age, experience, etc.). For example, such information may be displayed that is related to an object that represents an incarnation associated with client 16 in the virtual space (e.g., an avatar, a character being controlled by the user, etc.).

The space parameter information may include information related to one or more parameters of the virtual space. Parameters of the virtual space may include, for example, the rate at which time passes, dimensionality of objects within the virtual space (e.g., 2-dimensional vs. 3-dimensional), permissible views of the virtual space (e.g., first person views, bird's eye views, 2-dimensional views, 3-dimensional views, fixed views, dynamic views, selectable views, etc.), and/or other parameters of the virtual space. In some implementations, the space parameter information includes information related to the game parameters of a game provided within the virtual space. For instance, the game parameters may include information related to a maximum number of players, a minimum number of players, the game flow (e.g., turn based, real-time, etc.), scoring, spectators, and/or other game parameters of a game.

The network communication information may include information that enables the virtual space to interact with the Web. As used herein, the term "the Web" refers to the resources, entities, information, etc. that are linked for communication via the Internet. However, it should be appreciated that this term is used to illustrate a subset of embodiments within the scope of this disclosure, in which communication with virtual spaces is accomplished via the Internet. In other embodiments also falling within the scope of this disclosure, resources, entities, information, etc. may be linked for communication with system 10 via a network other than the Internet. In some embodiments, the network communication information may include network location information, command information, and/or other information.

Network location information may dictate one or more aspects of an assignment of network locations (e.g., a Uniform Resource Locator, a Web address, etc.) to an object in the virtual space, an area within the virtual space, a character within the virtual space, the virtual space as a whole, and/or other entities within the virtual space. The network address assigned to a given entity within the virtual space may enable interaction between the given entity (and/or other entities in the virtual space, the virtual space as a whole, etc.) and the Web by receiving information from the Web at, and/or transmitting information to the Web from, the assigned network address. In some implementations, the network location information may include a naming convention that dictates at least a part of the network address assigned to the given entity. For example, if the given entity is an object, the network location information may dictate the assignment of the same network address to the object independent from the one or more virtual spaces in which the object is located. As another example, if the given entity is an object, the network location information may dictate the assignment of a network address that includes a prefix, a suffix, and/or a root, that pertains specifically to the object, while other portions of the network address may be a function of one or more of a virtual space in which the object is currently located, an instance of a virtual space in which the object is currently located, a user with which the object is currently associated (e.g., a user that owns the object, is currently carrying the object, etc.), a server on which the instance of the virtual space is being executed, and/or other variables associated with the situation of the object. The naming convention and/or the name dictated by the network location information may enable the Web to "locate" the object within the virtual spaces provided by system 10 with some consistency.

In some embodiments, communication between the Web and an entity within a virtual space may include a command transmitted from the Web to the entity, and results of the command transmitted back to the Web. As such, the command information may include information related to a set of commands supported by system 10. Such information may include command identifications, operations to be executed in response to a command, a format in which the results of a command should be formatted, and/or other information related to commands.

The information related to the plurality of virtual spaces may be stored in an organized manner within information storage 18. For example, the information may be organized into a plurality of units of computer readable information referred to herein as "records." These records may include space records 24 (illustrated as space record 24*a*, space record 24*b*, and space record 24*c*) that pertain to individual virtual spaces, object records 25 (illustrated as object record 25*a* and object record 25*b*) that pertain to individual objects, and/or other records. In some embodiments, the records 24 and 25 may be stored together in a single hierarchal structure (e.g., a database, a file system of separate files, etc.). In some embodiments, the records may include a plurality of different "sets" of records, wherein each set of records includes one or more of space records 24 and/or object records 25 that are stored separately and discretely from the other space records 24 and/or object records 25.

Individual ones of space records 24 may correspond to individual ones of the plurality of virtual spaces. A given space record 24 may include information related to a corresponding virtual space. For example, the given space record 24 may include manifestation information, interface information, space parameter information, and/or network information related specifically to the corresponding virtual space. The network information in the given space record 24 may include network location information and/or command information.

The network location information in the given space record 24 may dictate one or more aspects of the assignment of network locations to entities (e.g., objects, avatars, characters, topography, areas, the virtual space as a whole, etc.) within the corresponding virtual space. As such, the network location information may include one or more of an identification of one or more entities within the virtual space that should and/or should not be assigned network locations for communication with the Web, a naming convention that dictates at least a portion of the name(s) of the network location(s) of entities within the virtual space that are assigned a network location, and/or other information related to the assignment of network locations within the virtual space. In identifying one or more entities within the virtual space that should and/or should not be assigned network locations, the network information location may specify individual entities that should and/or should not be assigned network locations, types of entities that should and/or should not be individually assigned with network locations (e.g., types of objects, avatars in general, certain features of topography, predetermined areas, etc.), groups of entities that should and/or should not be assigned with a common network location, and/or otherwise identify entities that should and/or should not be assigned network locations.

The command information in the given space record 24 may be related to commands supported within the corresponding virtual space. For example, the command information may include a set of commands that are supported if they are received at a network location associated with an entity in the virtual space. The set of commands may be divided into subsets that are specific to predetermined entities and/or groups of entities within the virtual space. For example, one subset of commands may be supported for a first entity or group of entities in the virtual space, while a second subset of commands may be supported for a second entity or group of entities in the virtual space.

Individual ones of object records 25 may correspond to individual objects that may be manifested within the virtual spaces provided by system 10. A given object record 25 may include information related to a corresponding object. For example, the given object record 25 may include manifestation information and network information related to the corresponding object.

The manifestation information in the given object record 25 may include, for example, visual representation information related to a visual representation of the object. The visual representation information may specify the shape, size, shading, texture, and/or other aspects of the visual representation of the object within the virtual spaces provided by system 10. The manifestation information in the given object record 25 may further include other information related to the manner in which object is manifested within the virtual spaces, such as one or more of the other types of manifestation information discussed above.

The network information related to the corresponding object may include network location information. The network location information may dictate one or more aspects of an assignment of a network location to the object. The one or more aspects of the assignment of the network location to the object dictated by the network location information may include one or more of a determination as to whether the object should be assigned a network location, a naming convention that specifies at least a portion of the name of the network location that is assigned to the object, and/or other information related to the assignment of a network location to the object.

In some embodiments, one or more aspects of the assignment of the object corresponding to the given object record 25 may be subject to conflicting network location information included within the object record 25 and a space record 24 that corresponds to a virtual space in which the object has been introduced. For example, the network location information (or lack thereof) within the given object record 25 may not dictate that the object should be assigned a network location, but the network location information within the space record 24 may specify that all objects of the type of the object that corresponds to the given object record 25 should receive a network location. In such implementations, the determination as to whether the object should be assigned a network location (in accordance with the network location information in the space record 24) may be made by determining a priority of the network location information in the given object record 25 and the network location information in the space record 24, and proceeding according to the network location information from the record (24 or 25) with the higher priority. This priority may be determined according to information within the virtual space, according to a system-wide priority algorithm, and/or according to other consideration.

As another example, the network location information within the given object record 25 may specify a naming convention that dictates at least a portion of the name of the network address to be assigned to the object that corresponds to the given object record 25, while the space record 24 of the virtual space into which the object has been introduced specifies a conflicting naming convention. In such cases, the conflict may be resolved according to a determination of priority between the records (as discussed above), the conflict may be resolved by determining the name of the network as a compromise of the conflicting naming conventions, the conflict may be resolved by assigning two network locations to the object, and/or the conflict may be resolved by some other technique for resolving the conflict.

It should be appreciated that these examples are not intended to be an exhaustive list of the possible conflicts that may arise between the network location information within the given object record 25 and space records 24 that correspond to virtual spaces into which the object may be introduced. Instead, these examples are intended to merely be illustrative of the techniques by which these and other conflicts may be resolved (e.g., according to a determination of priority, as a compromise between the conflicting network location information, as an aggregation of the network location information, by complying separately with each of the conflicting records, etc.). The technique implemented to resolve conflicts between the records may be a function of one or more of the virtual space into which the object is being introduced (e.g., on a per space basis), the object (e.g., on a per object basis), a user associated with the object (e.g., on a per user object), on a character or avatar associated with the object (e.g., on a per character basis), an administrative determination, system-wide settings, and/or other parameters.

The network information related to the object corresponding to the given object record 25 may include command information. The command information may include a set of commands that are to be supported for the object. In other words, the set of commands may be commands that, if received at the network location associated with the object from the Web, are to be executed in a predetermined manner (e.g., as specified in the command information), and the results are to be transmitted back to the Web in accordance with the command information.

In some embodiments, the commands specified in the command information within the given object record 25 may include one or more commands that are not specified in command information within a space record 24 that corresponds to a virtual space in which the object has been introduced, and/or one or more commands that are explicitly not allowed in the command information within the space record 24. In other embodiments, the command information within the given object record 25 may not include one or more commands that are specified as being supported by the command information within the given object record 25. In these types of situations, the determination as to whether the one or more commands for which there is a conflict should be supported at the network location assigned to the object may be made by determining a priority of the command information in the given object record 25 and the command information in the space record 24, and proceeding according to the network location information from the record (24 or 25) with the higher priority. This priority may be determined according to information within the virtual space, a system-wide priority algorithm, and/or according to other consideration. In some cases where conflicts exist in the command information of the given object record 25 and the space record 24 of the virtual space into which the object corresponding to the given object record 25 has been introduced, the conflict may be resolved by assigning two network locations to the object, and supporting different commands at each of the different network locations. It should be appreciated that these examples are intended to be illustrative of the techniques by which these and other conflicts may be resolved (e.g., according to a determination of priority, as a compromise between the conflicting network location information, as an aggregation of the network location information, by complying separately with each of the conflicting records, etc.). The technique implemented to resolve conflicts between the records may be a function of one or more of the virtual space into which the object is being introduced (e.g., on a per space basis), the object (e.g., on a per object basis), a user associated with the object (e.g., on a per user object), on a character or avatar associated with the object (e.g., on a per character basis), an administrative determination, system-wide settings, and/or other parameters.

Although information storage 18 is illustrated in FIG. 1 as a single entity, this is for illustrative purposes only. In some embodiments, information storage 18 includes a plurality of informational structures that facilitate management and storage of the information related to the plurality of virtual spaces. Information storage 18 may include the physical storage elements for storing the information related to the virtual spaces and/or the information processing and storage assets that enable information storage 18 to manage, organize, and maintain the stored information. Information storage 18 may include a relational database, an object oriented database, a hierarchical database, a post-relational database, flat text files (which may be served locally or via a network), XML files (which may be served locally or via a network), and/or other information structures.

In some embodiments, in which information storage 18 includes a plurality of informational structures that are separate and discrete from each other. In such embodiments, system 10 may include a central information catalog (e.g., managed by storage module 12) that includes information related to the location of the space records 24 and/or object records 25 included information storage 18 (e.g., network and/or file system addresses of individual space records). In some embodiments, the central information catalog may form a clearing house of information that enables users to initiate instances a chosen virtual space (e.g., to establish a server executing an instance of the chosen virtual space similar to server 14), to locate an instance of a chosen virtual space that is already running, and/or to use, invoke, or otherwise manipulate a chosen object within a virtual space. Accordingly, access to the information stored within the central information catalog may be provided to users based on privileges (e.g., earned via monetary payment, administrative privileges, earned via previous game-play, earned via membership in a community, etc.).

Server communication module 20 may facilitate communication between information storage 18 and server 14. In some embodiments, server communication module 20 enables this communication by formatting communication between information storage 18 and server 14. This may include, for communication transmitted from information storage 18 to server 14, generating markup elements (e.g., "tags") that convey the information stored in information storage 18, and transmitting the generated markup elements to server 14. For communication transmitted from server 14 to information storage 18, server communication module 20 may receive markup elements transmitted from server 14 to storage module 12 and may reformat the information for storage in information storage 18.

Server 14 may be provided remotely from storage module 12. Communication between server 14 and storage module 12 may be accomplished via one or more communication media. For example, server 14 and storage module 12 may communicate via a wireless medium, via a hard-wired medium, via a network (e.g., wireless or wired), and/or via other communication media. In some embodiments, server 14 may include a communication module 26, an instantiation module 28, a view module 30, and/or other modules. Modules 26, 28, 30, and 31 may be implemented in software; hardware; firmware; some combination of software, hardware, and/or firmware; or otherwise implemented. It should be appreciated that although modules 26, 28, 30, and/or 31 are illustrated in FIG. 1 as being co-located within a single unit (server 14), in some implementations, server 14 may include multiple units and modules 26, 28, 30, and/or 31 may be located remotely from the other modules.

Communication module 26 may be configured to communicate with storage module 12, and/or client 16. Communicating with storage module 12, and/or client 16 may include transmitting and/or receiving markup elements of the markup language. The markup elements received by communication module 26 may be implemented by other modules of server 14, or may be passed between storage module 12 and client 16 via server 14 (as server 14 serves as an intermediary therebetween). The markup elements transmitted by communication module 26 to storage module 12 or client 16 may include markup elements being communicated from storage module to client 16 (or vice versa), or the markup elements may include markup elements generated by the other modules of server 14.

Instantiation module 28 may be configured to execute one or more instances of one or more virtual spaces, such as an instance 32 of a virtual space present on server 14. Instantiation module 28 may execute instance 32 of the virtual space according to information received in markup element form from storage module 12. This information may include a space record 24 that corresponds to the virtual space and/or one or more object records 25 that correspond to objects within the virtual space.

Instantiation module 28 may comprise an application that is configured to execute instances of virtual spaces based on information conveyed thereto in markup element form. The application may be capable of initiating execution of an instance of a virtual space without accessing a local source of information (local to server 14) that describes various aspects of the configuration of the virtual space (e.g., manifestation information, space parameter information, etc.), or without making assumptions about such aspects of the configuration of the virtual space when initiating execution of the virtual space. Instead, such information may be obtained by instantiation module 28 from the markup elements communicated to server 14 from storage module 12. This may provide one or more enhancements over systems in which an application running on a server executes an instance of a virtual space dictates aspects of the virtual space (e.g., in "World of Warcraft"), such as manifestation information and/or space parameter information, or makes assumptions about such aspects. For example, the application included in instantiation module 28 may be capable of executing instances of a wider variety of "types" of virtual spaces (e.g., virtual worlds, games, 3-D spaces, 2-D spaces, spaces with different views, first person spaces, birds-eye spaces, real-time spaces, turn based spaces, etc.).

Similarly, instantiation module 32 may introduce objects within instance 32 of the virtual space from information received from storage module 12 (e.g., in the form of object records 25) without making assumptions about the manifestation, and/or other aspects of the object, and without accessing locally predetermined aspects of the object. As such, the transmission of an object record 25 to instantiation module 28 may enable instantiation module 28 to incorporate an object corresponding to the object record 25 into instance 32 even if the object has never been introduced into the virtual space of instance 32, and/or if the object has never been introduced into any virtual space by instantiation module 28 previously.

As has been mentioned above, an object record 25 received by instantiation module 32 and/or space record 24 that corresponds to instance 32 may include network information related to an object that corresponds to the received object record 25. This network information may include network location information. From the network location information, instantiation module 28 may associate one or more network locations (e.g., a Uniform Resource Locator) with the object. The network location(s) associated with the object may enable interaction between the object and the Web, as is discussed herein. Instantiation module 32 may associate the network location(s) with the object upon initiation of instance 32, if instance 32 is present in the virtual world initially. If the object is introduced into instance 32 at some time after instantiation, instantiation module 32 may associate the network location(s) with the object at the time of introduction.

The network location(s) associated with the object by instantiation module 32 may be persistent for instance 32. As such, the object can be accessed by the Web at the associated network location(s) as long as the object remains within instance 32. In some embodiments, the persistence of the association between the object and the network location(s) may be maintained even if the object leaves instance 32 and then returns at a later time. The persistence of the association between the object and the network location(s) may enhance interaction between the object and the Web by facilitating the location of the object by the Web.

Instance 32 may be characterized as a simulation of the virtual space that is being executed on server 14 by instantiation module 30. The simulation may include determining in real-time the positions, structure, and manifestation of objects, unseen forces, and topography within the virtual space according to the topography, manifestation, and space parameter information that corresponds to the virtual space. As has been discussed above, various portions of the content that make up the virtual space embodied in instance 32 may be identified in the markup elements received from storage module 12 by reference. In such implementations, instantiation module 28 may be configured to access the content at the access location identified (e.g., at network asset 22, as described above) in order to account for the nature of the content in instance 32.

As instance 32 is maintained by instantiation module 28 on server 14, and the position, structure, and manifestation of objects, unseen forces, and topography within the virtual space varies, instantiation module 28 may implement an instance memory module 34 to store information related to the present state of instance 32. Instance memory module 34 may be provided locally to server 14 (e.g., integrally with server 14, locally connected with server 14, etc.), or instance memory module 34 may be located remotely from server 14 and an operative communication link may be formed therebetween.

View module 30 may be configured to implement instance 32 to determine a view of the virtual space. The view of the virtual space may be from a fixed location or may be dynamic (e.g., may track an object). In some implementations, an incarnation associated with client 16 (e.g., an avatar) may be included within instance 32. In these implementations, the location of the incarnation may influence the view determined by view module 30 (e.g., track with the position of the incarnation, be taken from the perspective of the incarnation, etc.). The view determined by view module 30 may be determined for a variety of different perspectives (e.g., a bird's eye view, an elevation view, a first person view, etc.). The view may be a 2-dimensional view or a 3-dimensional view. These and/or other aspects of the view may be determined for the virtual space based on information stored in a space record 24 for the virtual space and provided from storage module 12 via markup elements (e.g., as space parameter information). Determining the view may include determining the identity, shading, size (e.g., due to perspective), motion, and/or position of objects, effects, and/or portions of the topography that would be present in a rendering of the view.

View module 30 may generate a plurality of markup elements that describe the view based on the determination of the view. The plurality of markup elements may describe identity, shading, size (e.g., due to perspective), and/or position of the objects, effects, and/or portions of the topography that should be present in a rendering of the view. The markup elements may describe the view "completely" such that the view can be formatted for viewing by the user by simply assembling the content identified in the markup elements according to the attributes of the content provided in the markup elements. In such implementations, assembly alone may be sufficient to achieve a display of the view of the virtual space, without further processing of the content (e.g., to determine motion paths, decision-making, scheduling, triggering, etc.).

In some embodiments, the markup elements generated by view module 30 that describe the view identify content (e.g., visual content, audio content, etc.) to be included in the view by reference only. For example, as was the case with markup elements transmitted from storage module 12 to server 14, the markup elements generated by view module 30 may identify content by a reference to an access location. The access location may include a Uniform Resource Locator that points to a network location. The network location identified by the access location may be associated with a network asset (e.g., network asset 22). For instance, the access location may include a network Uniform Resource Locater address (e.g., an internet Uniform Resource Locater address, etc.) at which network asset 22 may be accessed.

According to various embodiments, in generating the view, view module 30 may manage various aspects of content included in views determined by view module 30, but stored remotely from server 14 (e.g., content referenced in markup elements generated by view module 30). Such management may include re-formatting content stored remotely from server 14 to enable client 16 to convey the content (e.g., via display, etc.) to the user. For example, in some implementations, client 16 may be executed on a relatively limited platform (e.g., a portable electronic device with limited processing, storage, and/or display capabilities). Server 14 may be informed of the limited capabilities of the platform (e.g., via communication from client 16 to server 14) and, in response, view module 30 may access the content stored remotely in network asset 22 to re-format the content to a form that can be conveyed to the user by the platform executing client 16 (e.g., simplifying visual content, removing some visual content, re-formatting from 3-dimensional to 2-dimensional, etc.). In such implementations, the re-formatted content may be stored at network asset 22 by over-writing the previous version of the content, stored at network asset 22 separately from the previous version of the content, stored at a network asset 36 that is separate from network asset 22, and/or otherwise stored. In implementations in which the re-formatted content is stored separately from the previous version of the content (e.g., stored separately at network asset 22, stored at network asset 24, cached locally by server 14, etc.), the markup elements generated by view module 30 for client 16 reflect the access location of the re-formatted content.

As was mentioned above, in some embodiments, view module 30 may adjust one or more aspects of a view of instance 32 based on communication from client 16 indicating that the capabilities of client 16 may be limited in some manner (e.g., limitations in screen size, limitations of screen resolution, limitations of audio capabilities, limitations in information communication speeds, limitations in processing capabilities, etc.). In such embodiments, view module 30 may generate markup elements for transmission that reduce (or increase) the complexity of the view based on the capabilities (and/or lack thereof) communicated by client 16 to server 14. For example, view module 30 may remove audio content from the markup elements, view module 30 may generate the markup elements to provide a two dimensional (rather than a three dimensional) view of instance 32, view module 30 may reduce, minimize, or remove information dictating motion of one or more objects in the view, view module 30 may change the point of view of the view (e.g., from a perspective view to a bird's eye view), and/or otherwise generate the markup elements to accommodate client 16. In some implementations, these types of accommodations for client 16 may be made by server 14 in response to commands input by a user on client 16 as well as or instead of based on communication of client capabilities by client 16. For example, the user may input commands to reduce the load to client 16 caused by displaying the view to improve the quality of the performance of client 16 in displaying the view, to free up processing and/or communication capabilities on client 16 for other functions, and/or for other reasons.

From the description above it should be apparent that as view module 30 "customizes" the markup elements that describe the view for client 16, a plurality of different versions of the same view may be described in markup elements that are sent to different clients with different capabilities, settings, and/or requirements input by a user. This customization by view module 30 may enhance the ability of system 10 to be implemented with a wider variety of clients and/or provide other enhancements.

Network interaction module 31 may be configured to manage interaction between entities in instance 32 and the Web. This may include receiving a command transmitted to a network location associated with an entity, such as an object, within instance 32 and/or managing the execution of one or more operations that correspond to the received command (e.g., as dictated by command information associated with the entity and/or space). The command may be received in a Web protocol, such as HyperText Transfer Protocol or some other Web protocol. Network interaction module 31 may facilitate transmission of the results of the executed one or more operations back to the Web. The results may be transmitted back to the Web in a Web protocol, such as HyperText Transfer Protocol or some other Web protocol. The results may be transmitted from the network address assigned to the entity.

In some embodiments, network interaction module 31 may implement a standard protocol for interfacing between instance 32 and the Web. For example, network interaction module 31 may implement a Common Gateway Interface in which network interaction module 31 receives a request from the Web, identifies one or more supported commands and/or other information (e.g., arguments, etc.) in the request, manages execution of the supported commands, and returns the output of the commands to the Web.

In some implementations, receipt of a command by network interaction module 31 may cause network interaction module 31 to manage execution of one or more operations by instantiation module 28. For example, a command may specify a query for information from instance 32 (e.g., position, strength, health, wealth, status, score, etc.) related to an entity associated with the network location at which the command was received, information related to another entity, and/or information related to the virtual space as a whole. In response to such a command, network interaction module 31 may query instantiation module 28 for the requested information, receive the information from instantiation module 28, and transmit the requested information back to the Web. As another example, a command may specify a manipulation of an entity association with the network location at which the command was received, or manipulation of some other entity within instance 32. In response to this type of command, network interaction module 31 may transmit instructions to instantiation module 28 to manipulate instance 32 in accordance with the received command. Information related to the command may then be transmitted by network interaction module 31 to the Web. The information related to the command may include a status of the manipulation, a result of the manipulation, a reaction to the manipulation (e.g., by the manipulated entity and/or other entities within instance 32), and/or other information.

According to various embodiments, interactions of the Web with instance 32 facilitated by network interaction module 31 may include interactions between a browser 37 and instance 32. Browser 37 may include a web browser that enables a user, or some other entity, to display and/or interact with information (e.g., text, images, videos, audio, etc.) included in a webpage on the Internet and/or some other network. Browser 37 may transmit commands to network locations associated with entities within instance 32. For example, browser 37 may access a webpage configured to cause browser 37 to automatically transmit a predetermined command to a network location associated with a predetermined entity. Upon receiving results of the command from network interaction module 31, browser 37 may then format a display (or otherwise implement the results) in accordance with formatting instructions included in the webpage. As another example, browser 37 may access a webpage that causes browser 37 to present an interface to a user that enables the user to select an entity within an instance of a virtual space provided by system 10 (e.g., instance 32) and/or a command. The interface may include one or more selectable options (e.g., a pull-down menu, selectable buttons or links, etc.) and/or one or more fields in which the selected entity and/or commands may be manually input by the user. In response to a user selection, browser 37 may then transmit the selected command(s) to network interaction module 31 via the network location assigned to the selected entity.

As has been mentioned above, in some embodiments, instantiation module 28 may associate instance 32 with a network location. The network location may be associated with an entry point to the virtual space of instance 32. As such, instantiation module 28 may receive a request for entry into instance 32 at the network location associated with the entry point. The request may include information that identifies and/or authenticates the user. The request may be transmitted by browser 37 and/or a web server to the network location via a standard web protocol. The request may include a command to determine a view of instance 32 for the user, and to transmit the view to the user to be viewed by the user via a client, such as client 16 (e.g., to log the user/client into instance 32). In response to such a request, network communication module 31 may cause view module 30 to determine the appropriate view, and may cause the view information produced by view module 30 to be transmitted to the client associated with the user.

In some implementations, the command requesting entry to instance 32 may include information related to some third-party entity (e.g., a business, a user group, an education institution, a club, etc.) other than the user to be provided with entry to instance 32. In some embodiments, the third-party entity may or may not be related to the entity that "controls" instance 32 (e.g., has created instance 32 and/or the virtual space of instance 32, is running server 14 to execute instance 32, etc.). The command requesting entry to instance 32 for the user may identify and/or authenticate the third-party. The third-party may be a party that has facilitated access of the user to instance 32. For example, a hyper-link may appear on a third-party webpage that can be viewed and selected by the user via a web browser. Upon selection by the user, a command may be generated to the network location associated with the instance (e.g., by the web browser, by a web server serving the webpage, etc.) requesting entry for the user to instance 32. The command may be in a standard web protocol, such as a HyperText Transfer Protocol. Third-party authentication in the command may be required for entry into instance 32, as this would provide access to instance 32 only for users also authorized to access the webpage of the third-party entity. Third-party identification and/or authorization may be implemented to "count" the number of users directed to instance 32 by the third-party. Other implementation for third-party identification and/or authorization exist.

In some implementations, the command that identifies and/or authenticates the third-party entity may further specify one or more operations to be performed by server 14. The one or more operations may include, for example, providing a heightened degree of access to instance 32 for the user, endowing an object associated with the user (e.g., an avatar, an object controlled by an avatar, etc.) with one or more "special" abilities (e.g., abilities not provided automatically to users accessing instance 32), and/or other operations. This may enable the third-party entity to provide an enhanced experience to users within instance 32. By way of non-limiting example, a webpage associated with the third-party entity may charge a user for a special ability within instance 32. Upon receipt of payment (e.g., in real world or virtual currency) via a webpage provided by the third-party, the third-party entity may enable generation of a request to network interaction module 31 at the network location associated with instance 32 that identifies and/or authenticates the third-party entity, requests entry for the user into instance 32, and specifies one or more operations that will provide the user with the special abilities within instance 32. The request may be generated in a standard web protocol, and, as such, may be generated by the web server serving the third-party entity's webpage and/or the web browser being used by the user to access the webpage.

In some embodiments, client 16 provides an interface to the user that includes a view display 38, a user interface display 40, an input interface 42, and/or other interfaces that enable interaction of the user with the virtual space. Client 16 may include a server communication module 44, a view display module 46, an interface module 48, and/or other modules. Client 16 may be executed on a computing platform that includes a processor that executes modules 44 and 46, a display device that conveys displays 38 and 40 to the user, and provides input interface 42 to the user to enable the user to input information to system 10 (e.g., a keyboard, a keypad, a switch, a knob, a lever, a touchpad, a touchscreen, a button, a joystick, a mouse, a trackball, etc.). The platform may include a desktop computing system, a gaming system, or more portable systems (e.g., a mobile phone, a personal digital assistant, a hand-held computer, a laptop computer, etc.). In some embodiments, client 16 may be formed in a distributed manner (e.g., as a web service). In some embodiments, client 16 may be formed in a server. In these embodiments, a given virtual space instanced on server 14 may include one or more objects that present another virtual space (of which server 14 becomes the client in determining the views of the first given virtual space).

Server communication module 44 may be configured to receive information related to the execution of instance 32 on server 14 from server 14. For example, server communication module 44 may receive markup elements generated by storage module 12 (e.g., via server 14), view module 30, and/or other components or modules of system 10. The information included in the markup elements may include, for example, view information that describes a view of instance 32 of the virtual space, interface information that describes various aspects of the interface provided by client 16 to the user, and/or other information. Server communication module 44 may communicate with server 14 via one or more protocols such as, for example, WAP, TCP, UDP, and/or other protocols. The protocol implemented by server communication module 44 may be negotiated between server communication module 44 and server 14.

View display module 48 may be configured to format the view described by the markup elements received from server 14 for display on view display 38. Formatting the view described by the markup elements may include assembling the view information included in the markup elements. This may include providing the content indicated in the markup elements according to the attributes indicated in the markup elements, without further processing (e.g., to determine motion paths, decision-making, scheduling, triggering, etc.). As was discussed above, in some implementations, the content indicated in the markup elements may be indicated by reference only. In such implementations, view display module 46 may access the content at the access locations provided in the markup elements (e.g., the access locations that reference network assets 22 and/or 36, or objects cached locally to server 14). In some of these implementations, view display module 46 may cause one or more of the content accessed to be cached locally to client 16, in order to enhance the speed with which future views may be assembled. The view that is formatted by assembling the view information provided in the markup elements may then be conveyed to the user via view display 38.

As has been mentioned above, in some implementations, the capabilities of client 16 may be relatively limited. In some such implementations, client 16 may communicate these limitations to server 14, and the markup elements received by client 16 may have been generated by server 14 to accommodate the communicated limitations. However, in some such implementations, client 16 may not communicate some or all of the limitations that prohibit conveying to the user all of the content included in the markup elements received from server 14. Similarly, server 14 may not accommodate all of the limitations communicated by client 16 as server 14 generates the markup elements for transmission to client 16. In these instances, view display module 48 may be configured to exclude or alter content contained in the markup elements in formatting the view. For example, view display module 48 may disregard audio content if client 16 does not include capabilities for providing audio content to the user. As another example, if client 16 does not have the processing and/or display resources to convey movement of objects in the view, view display module 48 may restrict and/or disregard motion dictated by motion information included in the markup elements.

Interface module 48 may be configured to configure various aspects of the interface provided to the user by client 16. For example, interface module 48 may configure user interface display 40 and/or input interface 42 according to the interface information provided in the markup elements. User interface display 40 may enable display of the user interface to the user. In some implementations, user interface display 40 may be provided to the user on the same display device (e.g., the same screen) as view display 38. As was discussed above, the user interface configured on user interface display 40 by interface module 38 may enable the user to input communication to other users interacting with the virtual space, input actions to be performed by one or more objects within the virtual space, provide information to the user about conditions in the virtual space that may not be apparent simply from viewing the space, provide information to the user about one or more objects within the space, and/or provide for other interactive features for the user. In some implementations, the markup elements that dictate aspects of the user interface may include markup elements generated at storage module 12 (e.g., at startup of instance 32) and/or markup elements generated by server 14 (e.g., by view module 30) based on the information conveyed from storage module 12 to server 14 via markup elements.

In some implementations, interface module 48 may configure input interface 42 according to information received from server 14 via markup elements. For example, interface module 48 may map the manipulation of input interface 42 by the user into commands to be input to system 10 based on a predetermined mapping that is conveyed to client 16 from server 14 via markup elements. The predetermined mapping may include, for example, a key map and/or other types of interface mappings (e.g., a mapping of inputs to a mouse, a joystick, a trackball, and/or other input devices). If input interface 42 is manipulated by the user, interface module 48 may implement the mapping to determine an appropriate command (or commands) that correspond to the manipulation of input interface 42 by the user. Similarly, information input by the user to user interface display 40 (e.g., via a command line prompt) may be formatted into an appropriate command for system 10 by interface module 48.

In some implementations, the availability of certain commands, and/or the mapping of such commands may be provided based on privileges associated with a user manipulating client 16 (e.g., as determined from a login). For example, a user with administrative privileges, premium privileges (e.g., earned via monetary payment), advanced privileges (e.g., earned via previous game-play), and/or other privileges may be enabled to access an enhanced set of commands. These commands formatted by interface module 48 may be communicated to server 14 by server communication module 44.

Upon receipt of commands from client 16 that include commands input by the user (e.g., via communication module 26), server 14 may enqueue for execution (and/or execute) the received commands. The received commands may include commands related to the execution of instance 32 of the virtual space. For example, the commands may include display commands (e.g., pan, zoom, etc.), object manipulation commands (e.g., to move one or more objects in a predetermined manner), incarnation action commands (e.g., for the incarnation associated with client 16 to perform a predetermined action), communication commands (e.g., to communicate with other users interacting with the virtual space), and/or other commands. Instantiation module 38 may execute the commands in the virtual space by manipulating instance 32 of the virtual space. The manipulation of instance 32 in response to the received commands may be reflected in the view generated by view module 30 of instance 32, which may then be provided back to client 16 for viewing. Thus, commands input by the user at client 16 enable the user to interact with the virtual space without requiring execution or processing of the commands on client 16 itself.

According to various embodiments of the invention, an object 49 within instance 32 may provide an interface between instance 32 and the Web. The interface provided by object 49 may enable information available on the Web to be accessed by object 49. This information may then be implemented within instance 32 and/or relayed to client 16 via server 14. In order to interface with the Web, object 49 may include a browser 50. In some embodiments, the interface provided by object 49 and browser 50 between instance 32 and the Web may be provided via another entity within instance 32 that is configured to manipulate or control object 49.

In some implementations, browser 50 may include a web browser. Instantiation module 28 may include browser 50 with object 49 in accordance with one or both of an object record 25 associated with object 49 and/or a space record 24 for _________, instance 32. In addition to dictating the inclusion of browser 50 with object 49, the object record 25 associated with object 59 and/or the space record 24 for instance 32 may include a set of commands supported for browser 50. These commands may include different types of requests by browser 50 for information from the Web (e.g., requests from different websites and/or webpages available on the Web), different types of transmissions of information from the browser to the Web, different searches for information to be performed on the Web (e.g., searches for different types of information, searches from different sources on the Web, etc.), and/or other commands. Upon receipt of one of the commands supported for browser 50, browser 50 may access information from the Web that is served remotely from server 14. For example, browser 50 may access information and/or otherwise interact with a webpage served by web server 52, which is remote from server 14.

As instance 32 is being executed by instantiation module 28, instantiation module 28 may receive one of the supported commands for browser 50 (as specified in the corresponding object record 25 and/or for space record 24). This command may be received from client 16, provided that client 16 has the ability to control object 49 (e.g., object 49 is an avatar associated with client 16, object 49 is owned or carried by an avatar or character associated with client 16, object 49 is a public object that can be controlled by any client, etc.). In some cases, the command may be input to object 49 by another object within instance 32 that is under the control of client 16 (e.g., an avatar under the control of client 16 may input manipulate object 49 in a predetermined manner to input the command to instantiation module 28). In response to receiving the command, instructions may be provided to browser 50 from instantiation module 28 to execute the received command. Information received from the Web (e.g., from web server 52) by browser 50 in executing the command may then be transmitted to client 16, implemented within instance 32, and/or otherwise implemented.

In some implementations, object 49 may be under the sole control of a single user/client 16. In some implementations, object 49 may be controlled (e.g., at different times) by a plurality of users/clients 16. Where object 49 may be controlled by a plurality of users/clients 16, but not all of the users/clients that have access to instance 32, control of object 49 (and the included browser 50) may be provided to users on a subscription basis, upon payment of a fee (in real world and/or virtual currency), inclusion within a predetermined group, based on previous game play, based on administrative privileges, and/or provided on some other basis.

Figure 2:
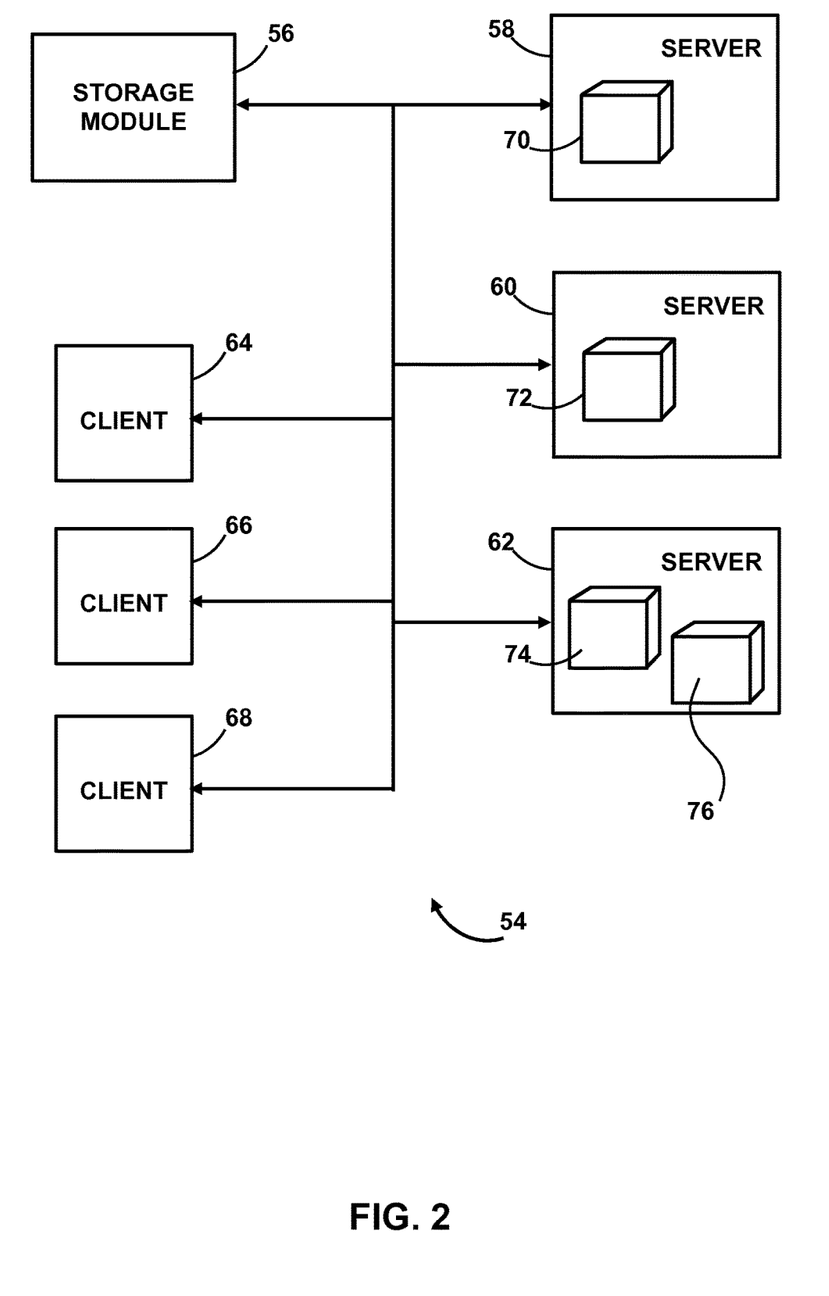
FIG. 2 illustrates a system configured to provide one or more virtual spaces that may be accessible to users, according to one or more embodiments of the invention.

It should be appreciated that system 10 as illustrated in FIG. 1 is not intended to be limiting in the numbers of the various components and/or the number of virtual spaces being instanced. For example, FIG. 2 illustrates a system 54, similar to system 10, including a storage module 56, a plurality of servers 58, 60, and 62, and a plurality of clients 64, 66, and 68. Storage module 56 may perform substantially the same function as storage module 12 (shown in FIG. 1 and described above). Servers 58, 60, and 62 may perform substantially the same function as server 14 (shown in FIG. 1 and described above). Clients 64, 66, and 68 may perform substantially the same function as client 16 (shown in FIG. 1 and described above).

Storage module 56 may store information related to a plurality of virtual spaces, and may communicate the stored information to servers 58, 60, and/or 62 via markup elements of the markup language, as was discussed above. Servers 58, 60, and/or 62 may implement the information received from storage module 56 to execute instances 70, 72, 74, and/or 76 of virtual spaces. As can be seen in FIG. 2, a given server, for example, server 62, may be implemented to execute instances of a plurality of virtual spaces (e.g., instances 74 and 76). Clients 64, 66, and 68 may receive information from servers 58, 60, and/or 62 that enables clients 64, 66, and/or 68 to provide an interface for users thereof to one or more virtual spaces being instanced on servers 58, 60, and/or 62. The information received from servers 58, 60, and/or 62 may be provided as markup elements of the markup language, as discussed above.

Due at least in part to the implementation of the markup language to communicate information between the components of system 54, it should be appreciated from the foregoing description that any of servers 58, 60, and/or 62 may instance any of the virtual spaces stored on storage module 56. The ability of servers 58, 60, and/or 62 to instance a given virtual space may be independent, for example, from the topography of the given virtual space, the manner in which objects and/or forces are manifest in the given virtual space, and/or the space parameters of the given virtual space. This flexibility may provide an enhancement over conventional systems for instancing virtual spaces, which may only be capable of instancing certain "types" of virtual spaces. Similarly, clients 64, 66, and/or 68 may interface with any of the instances 70, 72, 74, and/or 76. Such interface may be provided without regard for specifics of the virtual space (e.g., topography, manifestations, parameters, etc.) that may limit the number of "types" of virtual spaces that can be provided for with a single client in conventional systems. In conventional systems, these limitations may arise as a product of the limitations of platforms executing client 16, limitations of client 16 itself, and/or other limitations.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it should be understood that the present invention contemplates that, to the extent possible, one or more features of any embodiment can be combined with one or more features of any other embodiment.

What is claimed is:

1. A system configured to provide a virtual space that is accessible to a user, wherein a virtual space is a simulated physical space that has a topography, expresses real-time interaction by the user, and includes one or more virtual objects positioned within the topography that experience locomotion within the topography, the system comprising:
    a hardware server that provides an instance of a virtual space such that within the instance of the virtual space there are a plurality of network accessible virtual objects, the plurality of network accessible virtual object comprising a first virtual object associated with a first network location and a second virtual object associated with a second network location, and wherein the server is configured to perform operations of:
    configuring the instance of the virtual space in order to generate views of the virtual space for presentation to users; and
    managing commands transmitted to network locations associated with the plurality of network accessible virtual objects from browsers, such that:
        responsive to reception of a first command at the first network location, managing performance of one or more operations in accordance with the first command, and transmitting the results of the one or more operations to a given browser that transmitted the first command, and
        responsive to reception of a second command at the second network location, managing the performance of one or more operations in accordance with the second command, and transmitting the results of the one or more operations to a given browser that transmitted the second command, and wherein the one of the virtual objects present in the virtual space includes a browser configured to interact with webpages served remotely from the server.

2. The system of claim 1, wherein the first network location second network location are each a Uniform Resource Locator.

3. The system of claim 1, wherein the first command and the second command are each transmitted in a HyperText Transfer Protocol.

4. The system of claim 1, wherein the results are transmitted in a HyperText Transfer Protocol.

5. The system of claim 1, wherein the server is further configured to perform an operation of: obtaining access information for the network accessible object, wherein the access information includes information related to a set of commands to be supported at the network location associated with the network accessible object.

6. A non-transitory computer readable medium comprising:
    a unit of computer readable information that describes various aspects of a virtual object present in a virtual space, wherein the virtual space is a simulated physical space that has a topography, expresses real-time interaction by the user, and includes a plurality of virtual objects, such as the virtual object described by the unit of computer readable information, and positioned within the topography experiences locomotion within the topography, wherein the unit of computer readable information comprises:
        visual representation information that defines a visual representation of the virtual object in the virtual space;
        manifestation information that relates to the manner in which the object is manifested in the virtual space;
        network location information that dictates one or more aspects of an assignment of a network location to the virtual object such that a server providing an instance of the virtual space will assign a network location to the virtual object in accordance with the one or more aspects dictated by the network location information; and
        command information related to commands which, if transmitted to the network location assigned to the virtual object by a browser, are to be performed by the server providing the instance of the virtual space; wherein one of the pluralities of virtual objects present in the virtual space includes a browser configured to interact with webpages served remotely from the server.

7. The computer readable medium of claim 6, wherein the command information includes a set of commands to be supported by the server.

8. The computer readable medium of claim 6, wherein, for a given one of the commands, the command information dictates the operations to be performed in response to the given command.

9. The computer readable medium of claim 6, wherein the network location information includes a naming convention that dictates at least a portion of the name of the network location that is assigned to the object.

10. The computer readable medium of claim 6, wherein the network location is a uniform resource locator.

11. A system configured to provide a virtual space that is accessible to a user, wherein a virtual space is a simulated physical space that has a topography, expresses real-time interaction by the user, and includes one or more objects positioned within the topography that experience locomotion within the topography, the system comprising:
    a hardware server that provides an instance of a virtual space, wherein the instance of the virtual space includes a simulation of the virtual space that determines, in real-time, the positions, structure, and manifestation of objects, unseen forces, and topography within the virtual space, wherein the hardware server is configured to perform operations of:

obtaining topography information related to the topography of the virtual space, and manifestation information related to the manner in which objects positioned within the topography, and/or one or more unseen forces experienced by the objects in the virtual space, are manifested in the virtual space;

configuring the instance of the virtual space in accordance with the topography information and the manifestation information;

implementing the instance of the virtual space to determine a view of the virtual space, wherein the view information is configured for transmission to a client, the view information describing the view such that the client can assemble a display of the view from the view information;

receiving, at a Uniform Resource Locator associated with the virtual space, a login request that comprises authentication information and a view request, wherein the authentication identifies a third-party other than a client and a user of the client, wherein the view request is a request for view information from the server to be provided to a client, and wherein the login request is in a HyperText Transfer Protocol; and authenticating the third-party based on the authentication information, and responsive to authentication of the third-party, providing the requested view information to the client;

wherein a virtual object present in the virtual space includes a browser configured to interact with webpages served remotely from the server.

12. The system of claim 11, wherein the server is further configured to perform operations of:

determining the view requested in response to the view request;

generating the corresponding view information; and transmitting the view information to the client that corresponds to the login request.

13. The system of claim 11, wherein the login request further includes specific permissions and/or abilities for the client in the virtual space.

14. The system of claim 11, wherein the login request further includes that provide a character associated with the client with one or more of a power, a skill, a tool, or a weapon in the virtual space.

15. The system of claim 11, wherein the login request is generated by one or more processors that are separate from a computer platform that executes the client.

16. A system configured to provide a virtual space that is accessible to a user, wherein a virtual space is a simulated physical space that has a topography, expresses real-time interaction by the user, and includes one or more virtual objects positioned within the topography that experience locomotion within the topography, the system comprising:

a hardware server that performs operations including obtaining information related to a virtual space and providing an instance of the virtual space based on the obtained information, wherein the obtained information includes topographical information related to the topography of the given virtual space and manifestation information related to manifestation of the one or more virtual objects positioned within the topography and/or unseen forces experienced by the one or more virtual objects in the virtual space, wherein the instance of the virtual space includes a simulation of the virtual space that determines, in real-time, the positions, structure, and manifestation of virtual objects, unseen forces, and topography within the virtual space, and wherein one of the virtual objects present in the virtual space includes a browser configured to interact with webpages served remotely from the space server.

17. The system of claim 16, further comprising a client in operative communication with the hardware server, the client comprising an input interface configured to receive commands for manipulating one or more of the virtual objects in the virtual space, including commands that cause the object that includes the web browser to interact with one or more webpages served remotely from the space server.

18. The system of claim 17, wherein the hardware server further performs operations of:

implementing the instance of the virtual space to determine a view of the virtual space, and transmitting the view information to the client to enable the client to format the view of the virtual space for viewing by a user by assembling the view information.

19. The system of claim 17, wherein, in response to receipt by the client of a command to cause the object that includes the web browser to interact with one or more webpages served remotely from the hardware server, the hardware server further performs an operation of controlling the virtual object that includes the web browser such that the web browser interacts with the one or more webpages, and wherein the results of the interaction with the one or more webpages are configured to be displayed to the user by the client.

* * * * *